(12) United States Patent
Xu et al.

(10) Patent No.: US 9,813,301 B2
(45) Date of Patent: Nov. 7, 2017

(54) OPTIMIZATION FRAMEWORK FOR MULTI-TENANT DATA CENTERS

(71) Applicant: NEC Laboratories America, Inc., Princeton, NJ (US)

(72) Inventors: Qiang Xu, East Windsor, NJ (US); Cristian Lumezanu, East Windsor, NJ (US); Zhuotao Liu, Urbana, IL (US); Nipun Arora, Plainsboro, NJ (US); Abhishek Sharma, Philadelphia, PA (US); Hui Zhang, Princeton Junction, NJ (US); Guofei Jiang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 160 days.

(21) Appl. No.: 14/830,303

(22) Filed: Aug. 19, 2015

(65) Prior Publication Data

US 2016/0057018 A1    Feb. 25, 2016

Related U.S. Application Data

(60) Provisional application No. 62/039,502, filed on Aug. 20, 2014.

(51) Int. Cl.
*H04L 12/28*      (2006.01)
*H04L 12/24*      (2006.01)
(Continued)

(52) U.S. Cl.
CPC ............ *H04L 41/12* (2013.01); *H04L 41/083* (2013.01); *H04L 45/02* (2013.01); *H04L 45/121* (2013.01);
(Continued)

(58) Field of Classification Search
None
See application file for complete search history.

(56) References Cited

U.S. PATENT DOCUMENTS

| 6,944,675 | B2 | 9/2005 | Fujita |
| 7,280,481 | B2 * | 10/2007 | Rong ..................... H04L 45/12 370/238 |

(Continued)

FOREIGN PATENT DOCUMENTS

EP      2688173      1/2014

OTHER PUBLICATIONS

Chan, et al., "Load/Price Forecasting and Managing Demand Response for Smart Grids: Methodologies and challenges," IEEE Signal Processing Magazine, Sep. 2012, vol. 29, No. 5, pp. 68-85.

(Continued)

*Primary Examiner* — Otis L Thompson, Jr.
(74) *Attorney, Agent, or Firm* — Joseph Kolodka (57) ABSTRACT

Systems and methods for decoupled searching and optimization for one or more data centers, including determining a network topology for one or more networks of interconnected computer systems embedded in the one or more data center, searching for routing candidates based on a network topology determined, and updating and applying one or more objective functions to the routing candidates to determine an optimal routing candidate to satisfy embedding goals based on tenant requests, and to embed the optimal routing candidate in the one or more data centers.

15 Claims, 4 Drawing Sheets

(51) Int. Cl.
*H04L 12/727* (2013.01)
*H04L 12/721* (2013.01)
*H04L 12/751* (2013.01)
*H04L 12/26* (2006.01)
*G06F 9/455* (2006.01)

(52) U.S. Cl.
CPC .......... *H04L 45/123* (2013.01); *H04L 45/124* (2013.01); *G06F 9/45533* (2013.01); *H04L 43/087* (2013.01)

(56) References Cited

U.S. PATENT DOCUMENTS

| | | | | |
|---|---|---|---|---|
| 2006/0203745 | A1* | 9/2006 | Acharya | H04L 12/4604 370/254 |
| 2007/0155414 | A1* | 7/2007 | Zhuang | H04W 48/00 455/509 |
| 2013/0185438 | A1* | 7/2013 | Lumezanu | H04L 12/4641 709/226 |
| 2013/0279371 | A1* | 10/2013 | Takashima | H04L 45/38 370/254 |
| 2014/0019970 | A1* | 1/2014 | Okamoto | G06F 9/4856 718/1 |
| 2014/0122683 | A1 | 5/2014 | Zhao et al. | |
| 2014/0140216 | A1 | 5/2014 | Liu et al. | |
| 2016/0057054 | A1* | 2/2016 | Lumezanu | H04L 45/48 370/256 |
| 2016/0103958 | A1* | 4/2016 | Hebert | G06F 19/14 707/737 |
| 2016/0112349 | A1* | 4/2016 | Yoon | H04L 49/552 370/218 |
| 2016/0134527 | A1* | 5/2016 | Kwak | H04L 45/586 370/352 |

OTHER PUBLICATIONS

Nogales, et al., "Forecasting Next-day Electricity Prices by Time Series Models," IEEE Transactions Power System May 2002, vol. 17, No. 2, pp. 342-348.
Pindoriya, et al., "An Adaptive Wavelet Neural Network-Based Energy Price Forecasting in Electricity Markets", IEEE Transactions on Power Systems, Aug. 2008, vol. 23, No. 3, pp. 1423-1432.
Thatte, et al., "Towards a Unified Operational Value Index of Energy Storage in Smart Grid Environment," IEEE Transactions on Smart Grid, Sep. 2012, vol. 3, No. 3, pp. 1418-1426.
Weron, et al., "Forecasting Spot Electricity Prices With Time Series Models," Presentation at the Hugo Steinhaus Center, Wroclaw, Poland, 16 Pages, May 2005.
Michael Ward, "Working to Perfect the Flow of Energy", PJM eMKT User Guide, Jun. 2015, pp. 1-175.
R. Treinen, Market Operations, California ISP MRTU, "Locational Marginal Pricing (LMP): Basics of Nodal Price Calculation", CRR Educational Class #2, CAISO Market Operations, Dec. 2005, pp. 1-95.
Trishna Das, "Performance and Economic Evaluation of Storage Technologies", Iowa State University, Graduate Theses and Dissertations, Jan. 2013, pp. 1-258.
Chowdhury, et al., "Virtual Network Embedding with Coordinated Node and Link Mapping", IEEE, Infocom, Apr. 2009, 9 Pages.
Koponen, et a., "Network Virtualization in Multi-tenant Datacenters", 11th UNSENIX Symposium on Networked Systems Design and Implementation (NSDI 14), Apr. 2014, pp. 1-15.
Zarifis, et al., "DIBS: Just-in-time Congestion Mitigation for Data Centers", EuroSys, Apr. 2014, pp. 1-14.
Zhou, et al., "WCMP: Weighted Cost Multipathing for Improved Fairness in Data Centers", EuroSys, Apr. 2014, pp. 1-13.
Yu, et al., "Rethinking Virtual Network Embedding: Substrate Support for Path Splitting and Migration." ACM SIGCOMM Computer Communication Review 38, No. 2, Apr. 2008, pp. 17-29.

\* cited by examiner

OPTIMIZATION FRAMEWORK FOR MULTI-TENANT DATA CENTERS

RELATED APPLICATION INFORMATION

This application claims priority to provisional application No. 62/039,502 filed Aug. 20, 2014, the contents of which are incorporated herein by reference.

BACKGROUND OF THE INVENTION

Technical Field

The present invention relates generally to an optimization framework for data centers, and more particularly, to a system and method for decoupled searching and optimization for multi-tenant data centers.

Description of the Related Art

With the advent of software-defined networking, network optimization has become a significant goal in multi-tenant data centers, leading to various optimization opportunities oriented by diverse objectives (e.g., short latency, low path inflation, minimal configuration cost, etc.). However, considering the number of optimization request in a multi-tenant data center, the search space of routing, and the search algorithmic complexity, such optimization processes costs non-trivial computation resource and time (e.g., because conventional systems require employment of different search algorithms for each tenant).

Along with the rise of cloud computing, multi-tenant data centers grow into the scale of thousands of switches and servers to host a large number (e.g., tens of thousands) of tenant Virtual Machines (VMs). Managing multi-tenancy at such a scale to ensure efficiency, scalability and agility is a challenging problem drawing considerable research and engineering attention. Conventional systems generally place management effort at hypervisors, assuming that tenant networking is mostly decided by network locations of tenant VMs. However, this does not hold true anymore as software-defined networking (SDN) begins to play an increased role in data centers. For example, even if the network locations of VMs are decided, the in-network forwarding could still differ.

From the perspective of optimization, there have been several attempts to achieve the optimal routing oriented by particular pre-defined objective functions. These systems/methods generally work by first proposing some objective functions, expecting that the objective functions may achieve some increased performance, or improved properties (e.g., higher resource efficiency, lower congestion, etc.). These conventional systems/methods iterate over the network to incrementally add links to interconnect the tenant's virtual machines, and the links to add are decided by the proposed objective functions. These systems/methods solutions can be used to optimize a single Virtual Terminal Network (VTN)". However, in a multi-tenant data center network, the number of VTN optimization requests may be significant, and conventional systems/methods cannot optimize a large number of VTNs while achieving scalability and network efficiency.

SUMMARY

A computer implemented method for decoupled searching and optimization for one or more data centers, including determining a network topology for one or more networks of interconnected computer systems embedded in the one or more data center, searching for routing candidates based on a network topology determined, and updating and applying one or more objective functions to the routing candidates to determine an optimal routing candidate to satisfy embedding goals based on tenant requests, and to embed the optimal routing candidate in the one or more data centers.

A system for decoupled searching and optimization for one or more data centers, including a determiner for querying a network topology for one or more networks in the one or more data centers, a routing searching device for searching for routing candidates based on the network topology determined, and an optimizer for updating and applying one or more objective functions to the routing candidates to determine an optimal routing candidate to satisfy embedding goals during embedding.

A computer-readable storage medium including a computer-readable program, wherein the computer-readable program when executed on a computer causes the computer to perform the steps of determining a network topology for one or more networks of interconnected computer systems embedded in the one or more data center, searching for routing candidates based on a network topology determined, and updating and applying one or more objective functions to the routing candidates to determine an optimal routing candidate to satisfy embedding goals based on tenant requests, and to embed the optimal routing candidate in the one or more data centers.

These and other advantages of the invention will be apparent to those of ordinary skill in the art by reference to the following detailed description and the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to systems and methods for a search and optimization decoupled optimization framework for multi-tenant data centers to improve utilization of underlying network infrastructure and the performance of individual virtual tenants (VT). The present principles may also be employed to reduce computation costs in searching for routing options, which is desirable in multi-tenant data centers because of scalability concerns for the network.

In one embodiment, the present principles may employ an optimization framework that decouples searching and optimization. In one embodiment, to maximize the re-use of searching results, the optimization framework according to the present principles may offer a searching and optimizing "decoupled" model as follows: (1) searching a list of routing candidates based on only the network topology; (2) applying a proposed objective function over the candidates; and (3) finalizing the best among all candidates. A drawback of the "decoupled" method is that searching may be costly, but as an individual tenant's virtual network (VN) is generally relatively small, the costs may be addressed in various ways. For example, as a small number of VMs may refine a search space to a few switches, even performing an exhaustive search may still result in acceptable costs. Furthermore, the number of candidates and/or hop inflation may be limited to further refine the search space (e.g., as a small number of alternative routing candidates may be sufficient).

In one embodiment, the present principles may be employed to achieve tenant-level routing control in multi-tenant data centers based on tenant requests (e.g., embedding goals). Tenant routing updates may occur at all times in multi-tenant data centers. Frequent arrivals of new tenant networks or routing updates to adapt the existing tenant networks to dynamic network conditions may trigger considerable amounts of routing update requests. Each request may involve searching for a suitable overlay virtual network on top of the whole datacenter network to fulfill the requirements of a particular tenant network. However, such large volumes of requests in turn may result in non-trivial topological search costs. Furthermore, embedding tenant networks includes more than simply determining one random routing option, but rather may include determining an overlay network to achieve various embedding objectives and requirements proposed by tenants or network operators (e.g., bandwidth guarantee embedding).

In one embodiment, the present principles may be employed for automating virtual tenant network embedding in multi-tenant data centers using a search and embedding "decoupled model". Specifically, for each tenant network, the present principles may be employed to comprehensively search a list of desired overlay network candidates (e.g., based on network topology and/or a tenant's VM placement), and to apply an objective function over these candidates (e.g., routing candidates) to finalize the candidate that best satisfies an embedding goal.

In various embodiments, the present principles provide several advantages over conventional systems and methods. For example, topology search results may be cached and reused across tenant network embedding. This reuse of topology search results enables avoidance of repeating the network search for a new tenant with the same VM placement as any existing tenants (e.g., their VMs are hosted by the same set of hypervisors). Furthermore, as search effort may be independent from network dynamics and embedding goals (e.g., "decoupled"), it is not necessary to repeat the network search for existing tenants when their current networks are affected by network dynamics (e.g., link congestion, failures, etc.), or when the existing tenants want to re-embed their networks to achieve a new embedding objective.

In one embodiment, the present principles may also enable complete flexibility to fulfill tenant network embedding goals, thereby enabling network operators to no longer be restricted to employing various search algorithms to achieve embedding goals. Instead, the present principles may be employed to design and implement sophisticated objective functions and/or methods to effectively evaluate routing candidates to determine the most desired candidates according to various embodiments.

A drawback of the decoupled design may be that finding all desired overlay network candidates for each tenant without a search space being restricted by specific search objective functions may be costly. However, since the VMs of one tenant typically span across only a few racks in a data center, the search space may be reduced to a small subgraph of the entire network to confine the search cost. Furthermore, as most data center topologies (e.g., VL2, fat-tree, etc.) are hierarchically organized into several layers and their traffic is not forwarded back and forth between different layers, this property may be employed to further refine the search space according to various embodiments.

In one embodiment, the present principles may be employed as a scalable system for automating VTN embedding in multi-tenant data centers. From the perspective of network management, the present principles enable effective and agile tenant management (e.g., traffic accountability, customized routing selection, etc.) via explicit tenant-level in-network routing control according to the present principles. From the perspective of network performance, the novel search and embedding decoupled design enables network operators to effectively achieve a plurality of tenant network embedding goals to improve a wide range of networking performance goals according to the present principles.

For the sake of simplicity in configuration, encapsulation protocols (e.g., VXLAN, NVGRE, etc.) are widely adopted in data centers. However, by simply tunneling tenant traffic, network operators may lose visibility and/or tracking accountability. This loss of visibility and/or tracking accountability may be because network operators are not able to identify the tenant that originates any traffic, as traffic is encapsulated at the hypervisors before arriving at the network, and one hypervisor may host VMs for multiple tenants. Such a lack of visibility may become even worse when data centers run link aggregation and/or perform load balancing (e.g., to spread traffic across redundant physical links). As a result, even if a tenant occupies only a tiny fraction of computation resources in an entire data center (e.g., a few VMs hosed by a small number of hypervisors), its traffic may appear at many switches and physical links, causing network operators to lose the awareness of the actual forwarding inside the data center network.

The lack of the in-network routing management at the granularity of the tenant in conventional systems and methods creates network operation restrictions. For example, it is difficult for network operators to perform monitoring, measurement and troubleshooting for a specific tenant as its traffic may span across large numbers of physical links and switches. These management restrictions may result in networking performance degradation. For example, when link congestion or failures are encountered, it is difficult for network operators to locate an affected tenant and reconfigure the network in a reasonable amount of time. Furthermore, as virtual private clouds gain popularity, tenants have incentives to customize the private cloud based on their own needs (e.g., one tenant might want to promote latency performance of web servers, whereas another tenant may be concerned about bandwidth for MapReduce tasks). Without explicit per-tenant routing management, network operators cannot customize resource utilization for individual tenants.

Therefore, to effectively manage tenant networks, it is desirable for network operators to have in-network routing management at the granularity of tenants. For example, in one embodiment, for each tenant, network operators can explicitly configure a Virtual Tenant Network (VTN), which may be essentially an overlay network connecting its VMs. Each tenant's traffic may be confined within its VTN, and no other physical links can carry the tenant's traffic according to various embodiments. As tenants can be identified as their VTNs, traffic is accountable to tenants, and customized routing configurations for individual tenants may be enabled according to the present principles.

In one embodiment, to achieve efficient VTN embeddings, the following two challenges may be addressed according to the present principles: (1) the scalability issue caused by frequent VTN embedding requests, and (2) the restricted capability to achieve sophisticated embedding goals. Applications of the present principles which address these challenges are described in further detail herein below.

It should be understood that embodiments described herein may be entirely hardware or may include both hardware and software elements, which includes but is not limited to firmware, resident software, microcode, etc. In a preferred embodiment, the present invention is implemented in hardware. The present invention may be a system, a method, and/or a computer program product. The computer program product may include a computer readable storage medium (or media) having computer readable program instructions thereon for causing a processor to carry out aspects of the present invention.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
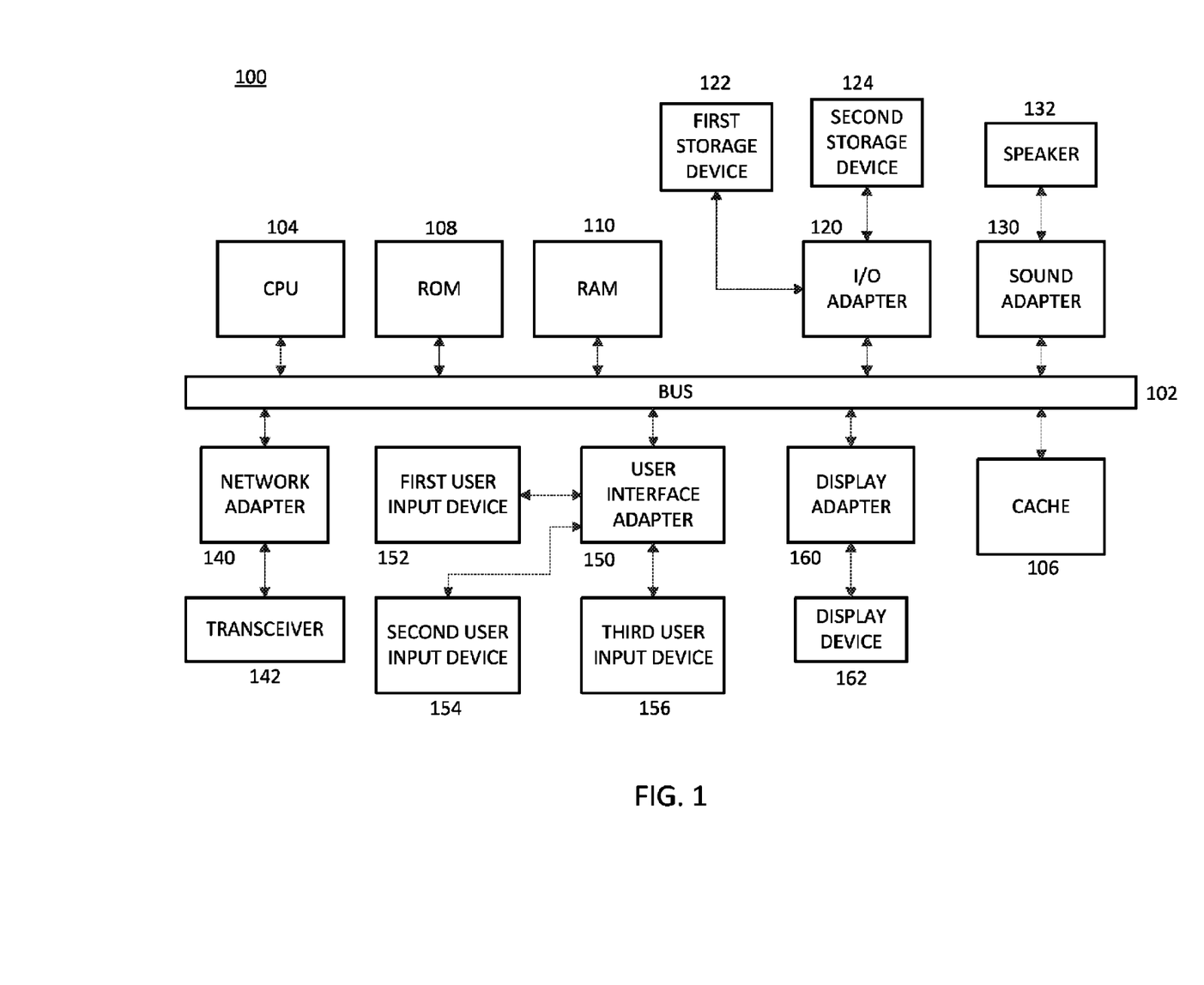
FIG. 1 shows an exemplary processing system to which the present principles may be applied, in accordance with an embodiment of the present principles.

Referring now to the drawings in which like numerals represent the same or similar elements and initially to FIG. 1, an exemplary processing system 100, to which the present principles may be applied, is illustratively depicted in accordance with one embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 200 and 400, described below with respect to FIGS. 2 and 4, respectively, are systems for implementing respective embodiments of the present principles. Part or all of processing system 100 may be implemented in one or more of the elements of systems 200 and 400.

Figure 2:
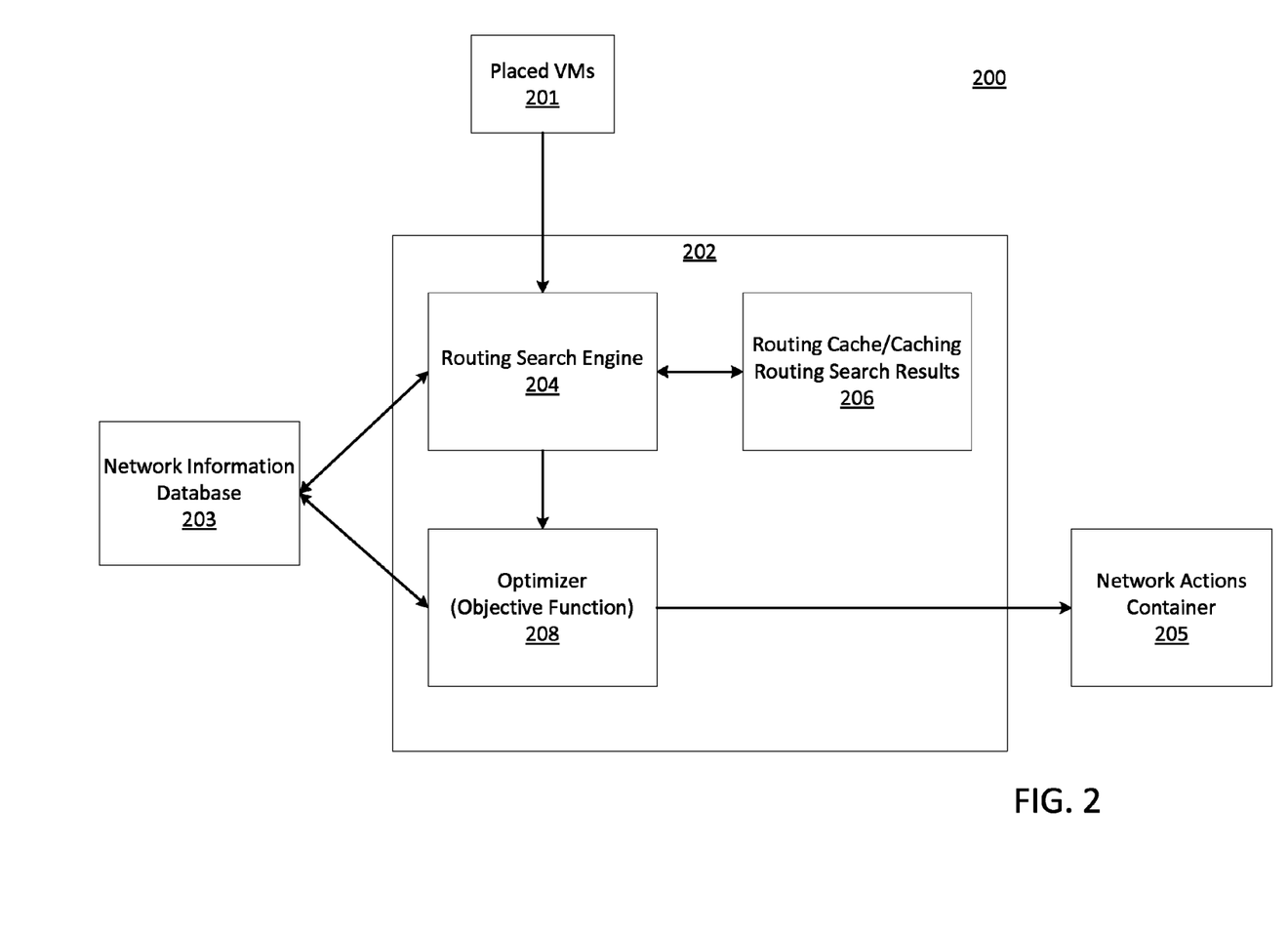
FIG. 2 shows an high-level diagram of an exemplary system/method for decoupled searching and optimization for multi-tenant data centers, in accordance with an embodiment of the present principles.
Figure 3:
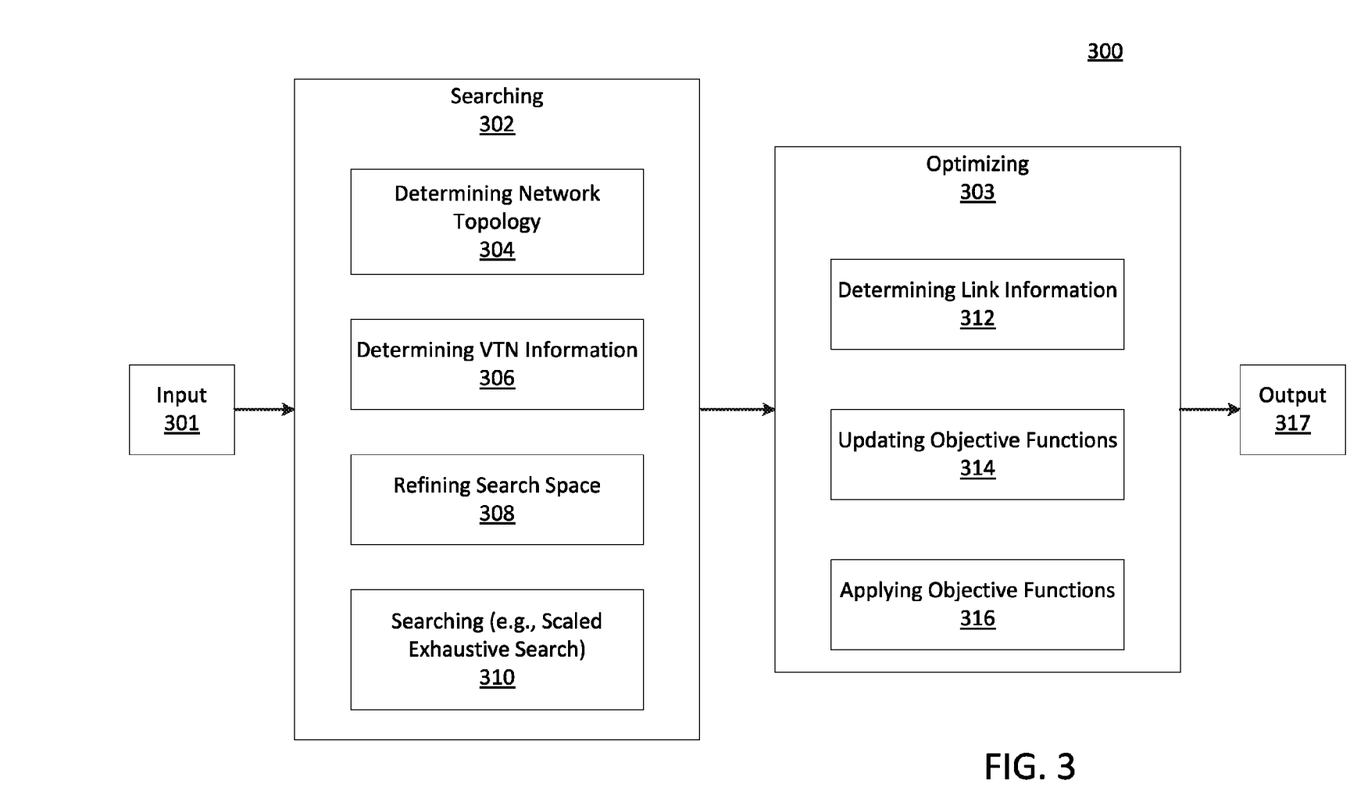
FIG. 3 shows an exemplary method for decoupled searching and optimization for multi-tenant data centers, in accordance with an embodiment of the present principles.

Further, it is to be appreciated that processing system 100 may perform at least part of the method described herein including, for example, at least part of methods 200 and 300 of FIGS. 2 and 3, respectively. Similarly, part or all of system 400 may be used to perform at least part of methods 200 and 300 of FIGS. 2 and 3, respectively.

Referring now to FIG. 2, a high-level diagram of an exemplary system/method 200 for decoupled searching and optimization for multi-tenant data centers is illustratively depicted in accordance with one embodiment of the present principles. In one embodiment, the system 202 may include a search router/routing search engine 204 and an optimizer 208 as the main components of the system 202. The search router/search engine 204 may search a list of routing candidates (e.g., placed virtual machines (VMs)) in block 201 for virtual tenant network (VTN) placement requests, and the routing candidates may be stored in a routing cache 206 using, for example, a hash data structure. In one embodiment, the list of VMs 201 in the VTN may be placed on one or more hypervisors before searching using the search router/routing search engine 204. The search router/search engine 204 may determine network topology information from a network information database 203, and may perform a search for spanning trees connecting VMs within the VTN according to various embodiments of the present principles.

In one embodiment, the optimizer may employ sophisticated objective functions (e.g., the route shared with the least number of other tenants, the route contains most local links, etc) in block 208, and the objective functions may be determined in advance or in real time (e.g., by a network operator). The optimizer 208 may receive input (e.g., list of routing candidates) from the search router/search engine 204, and may apply objective functions (e.g., one-by-one) to determine the most desirable candidate (i.e., the best one according to the objective function) among the list of routing candidates stored in the routing cache 206. The most desirable route may be selected by the optimizer 208, and the system 202 may instruct a network action container 205 to configure the selected route (e.g., most desirable candidate route among the list of routing candidates) according to the present principles. The searching using the search router/routing search engine 204 and the optimization using the optimizer 208 will be described in further detail herein below.

Referring now to FIG. 3, an exemplary method 300 for decoupled searching and optimization for multi-tenant data centers for multi-tenant data centers is illustratively depicted in accordance with one embodiment of the present principles. In one embodiment, the method 300 may be employed to search for a plurality of routing candidates that topologically may interconnect with all of a particular tenant's VMs. In one embodiment, a tenant network request may be input in block 301, and searching may be performed in block 302.

In one embodiment, the searching 302 may be based on network topology, which may be determined in block 304. Searching 302 using determined network topology in block 304 is relatively stable (e.g., the physical network topology rarely changes, if the topology remains, the route candidates for a given source-destination pair remain as well, and as such, search results may be employed across other tenants with VMs placed on the same set of hypervisors. The network topology 304, may be retrieved from a network information database (not shown) according to the present principles. In various embodiments, the searching 302 may include determining/querying network topology 304, determining/querying VTN information 306, refining the search space 308, and/or performing a scaled exhaustive search 310 according to the present principles.

In block 304, the network topology may be determined/queried to gather information regarding a particular network topology, and this information may be stored in, for example, a non-transitory computer-readable storage medium. In one embodiment, the determining of network topology in block 304 may be a background task that may continue to be executed regardless of any VTN requests. In one embodiment, a request to a network information database for the entire network topology may be executed, and the determining in block 304 may then periodically send requests for topology updates.

In one embodiment, topology updates may include link status update information (e.g., link up and link down), although link updates generally do not occur frequently. In one embodiment, the determining in block 304 may include maintaining a local knowledge base of network topology updates in a storage device. The local knowledge base of network topology may be accessed frequently when there are VTN request arrivals, as their routing candidates may be determined based upon this local knowledge base according to various embodiments of the present principles. In some embodiments, the knowledge base may be stored in local fast memory.

In block 306, VTN information may be determined/queried to gather information regarding current VTN requests according to one embodiment, and may be information related to a current VTN for optimization. The information determined in block 306 may include, for example, a list of VMs in a particular VTN and a hypervisor hosting each of one or more VMs. It may be assumed that VMs in a given VTN have already been placed. The assumption that VMs have already been placed is not a constraint in the optimization method/framework 300, but rather is a valid assumption in practice because the location to place VMs may be constrained by computation resource utilization, which may be decoupled from the method of connecting of the VMs according to the present principles.

In block 308, the search space may be refined to manage the search space for routing candidates according to one embodiment. For example, in a multi-tenant data center, the size of a particular VTN may be only a few VMs (e.g., 5, 10, 20, etc.), and as such, even if these VMs span across an entire data center, the number of switches sitting in the middle (e.g., the switches concatenating together to form route candidates) may remain small. Thus, searching for routing candidates in the space of the whole data center is inefficient. However, during refinement of the search space in block 308, if a subset of switches is chosen as the search space for candidate routes, there may be another switch not in the subset that may lead to a better route. This problem is an NP (e.g., in algorithm complexity analysis, NP-hard refers to "nondeterministic polynomial time) hard problem, which may be referred to as the Steiner spanning tree.

In one embodiment, the Steiner tree problem may be superficially similar to the minimum spanning tree problem according to the present principles. For example, given a set of hypervisors, they may be interconnected by a network of a smallest possible size, where the size may be the total number of links in the tree. A difference between the Steiner tree problem and the minimum spanning tree problem is that, in the Steiner tree problem, extra intermediate switches may be added to the tree in order to reduce the size of the spanning tree.

In one embodiment, in the setting of a multi-tenant data center, there may be additional properties added to the Steiner tree problem. One is that the network topology is generally somewhat structured, and a second property is that the present principles may be employed to search for all spanning trees under size inflation constraints rather than just one Steiner spanning tree. The first property may be employed to refine the search space in block 308 to determine which subset of switches should be included in the search for spanning trees. In one embodiment, an exhaustive search, rather than an oriented search may be performed in block 310 according to the present principles because of the second property. In one embodiment, it is desired to perform an exhaustive search because to find all routing candidates, but this could be very costly. Thus, the second property (e.g., size constraint) may be applied to limit the search space.

In block 310, a scaled exhaustive search may be performed on a small scale of selected switches and hypervisors for all spanning trees that satisfy a size inflation constraint (i.e., the second property above) according to one embodiment of the present principles. As the VMs in a VTN are generally allocated based on a locality preference (e.g., 3 out of 5 VMs in this VTN should be no more than one-hop away), these VMs and the switches connecting the VMs may span across a small number of racks in a data center, the network subgraph may be small enough to perform exhaustive searches without high costs (e.g., computational costs) in block 310.

In one embodiment, the output of the searching in block 302 may be employed as input for optimization in block 303 to determine the best/optimal routing candidate from the list of routing candidates and/or to satisfy embedding goals (e.g., tenant requests), with the embedding goals including, for example, a particular number of hops, a requested bandwith, etc.). The best routing candidate may be, for example, a candidate which best fulfills both a data center operator's and a tenant user's interests/requirements according to one embodiment of the present principles.

In one embodiment, the optimizing in block 303 may be "decoupled" (e.g., decoupling/separating searching and optimizing) to enable data center operators to design, generate, and/or implement sophisticated global objective functions according to the present principles. In one embodiment, because the system/method according to the present principles is decoupled, search results may be independent of objective functions, and may depend on only the network location of VMs. Thus, the search results for the VTNs of the same network locations can be re-used. Each VTN can also have its own objective function applied on the same set of candidates (e.g., search results) according to various embodiments. The objective functions may be employed to evaluate each spanning tree using a controller (not shown) by considering which virtual links each physical link carries. Conventional systems and methods cannot perform this evaluation because it is not possible without decoupled searching and optimization according to the present principles (e.g., because without decoupling according to the present principles, the virtual links which a physical link carries is unknown).

In block 312, link information may be determined/queried to determine precisely the current network utilization (e.g., regarding the links belonging to each routing candidate) according to one embodiment. Similarly to the determining/querying VTN information in block 306, this link information may be exchanged with a network information database according to the present principles. In block 314, one or more objective functions (e.g., evaluation metrics for scoring overlay candidates) may be updated to generate sophisticated objective functions which may be adaptive to network dynamics and/or tenant demands/interests. For example, if a tenant network employs a VM as a web server, the objective function may promote the latency performance for the physical links carrying that VM's traffic. Although the example of a tenant's web server is described for illustrative purposes, a plurality of objective functions may be employed for a plurality of tenant demands/interests according to various embodiments.

In one embodiment, the decoupled searching 302 and optimizing 303 may be employed to generate sophisticated methods or objective functions to fulfill arbitrary embedding goals according to the present principles. For example, in one embodiment, a valid objective function from block 314 may be as sophisticated as a combination function balancing the weights of latency, bandwidth, the number of hops, etc. The present principles may be employed using any objective functions, and the method 300 is scalable to any size network (e.g., VTN), thereby enabling complete flexibility and capability to achieve any VTN embedding goals. After updating one or more objective functions, the updated objective functions may be applied iteratively to all candidates in block 316, and may select the best candidate accordingly, and output results to a network action task container in block 317 to achieve embedding goals according to various embodiments of the present principles.

Figure 4:
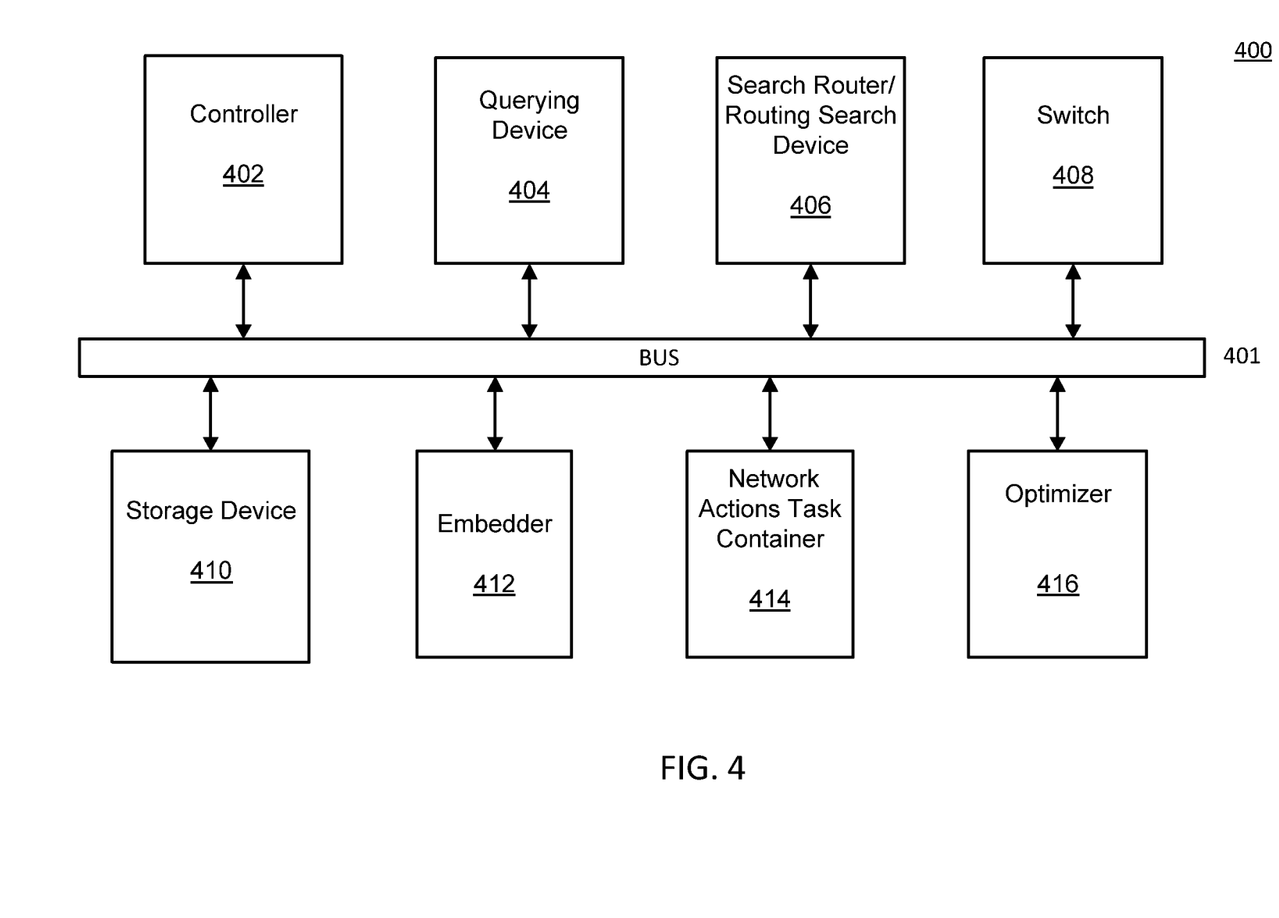
FIG. 4 shows an exemplary system for decoupled searching and optimization for multi-tenant data centers, in accordance with an embodiment of the present principles.

Referring now to FIG. 4, with continued reference to FIGS. 2 and 3, an exemplary system 400 for decoupled searching and optimization for multi-tenant data centers is illustratively depicted in accordance with one embodiment of the present principles. A controller 402 may be connected to a bus 401, and may be employed to control all or part of 200 and/or 300 in FIGS. 2 and 3, respectively, in addition to controlling systems 100 and/or 400 according to various embodiments of the present principles.

While many aspects of system 400 are described in singular form for the sakes of illustration and clarity, the same can be applied to multiples ones of the items mentioned with respect to the description of system 400. For example, while a single switch 408 is described, more than one switch 408 can be used in accordance with the teachings of the present principles, while maintaining the spirit of the present principles. Moreover, it is appreciated that the switch 408 is but one aspect involved with system 400 than can be extended to plural form while maintaining the spirit of the present principles.

The system 400 can include a controller 402, a determiner/evaluator 404, a routing searching device/search engine 406, a routing searching device 406, a switch 408, a storage device 410, an optimizer 412, a network actions task container, and/or an embedder 416 according to various embodiments of the present principles.

In one embodiment, the controller 402 may be employed to instruct the determiner 404 to determine/query network topology 304, VTN information 306, and/or link information 316 (as described above with respect to FIG. 3). In one embodiment, a routing searching device/search engine 406 may be employed to generate a list of desired routing candidates based on, for example, placement of particular VMs. For simplicity of illustration, unless otherwise stated, routing may be defined as tenant-level routing, which may include an overlay network.

In some embodiments, as it may not be possible to determine all possible routings for a given VM placement, the search engine 406 may determine all "desired" routing candidates according to the present principles. For example, in a layered network layout, a routing is "desired" if traffic between any two VMs does not bounce back and forth between two different layers. For other topologies, other factors may be considered to determine whether a routing candidate is desired by a tenant (e.g., limited number of hops), or whether a one or more particular candidates should be excluded from the search.

For simplicity of illustration, the search engine will be described with respect to a layered data center topology including the following features: (1) the topology includes a set of isolated pods, which may be interconnected by one or more core switches 408, (2) each isolated pod includes two or more layers, and (3) switches 408 on one layer are connected only to switches 408 on different layers. Many current data center implementations (e.g., VL2, fat-tree, etc.) satisfy these requirements.

In one embodiment, a network graph (not shown) may be employed for searching using the search router/routing engine 406, and each node (e.g., VM) may be associated with a height. The core switches 408 may be assigned a height (e.g., 1), and the initial height for other nodes may be set to infinity (e.g., typically, it may be less than 20, but as long as it's more than the total number of switches, the method is effective) according to the present principles. The controller 402 may instruct the search router/routing searching device 406 to trace down from core switches 408 toward other nodes to assign them a height. The height of a particular node (e.g., K) may be the minimum height amongst neighboring nodes plus one in some embodiments, and each layer may have a layer number equal to the node height on that particular layer.

For simplicity of illustration, a "straight path" will be described for the search using the search router/search engine 406. A path may be considered a "straight path" if all nodes on the path are different heights, and there may be two types of straight paths (e.g., upward and downward). The upward path may be from a source node at a lower layer to a destination node at a higher layer, and the downward path may be from a source node at a higher layer to a destination node at a lower layer according to the present principles.

In one embodiment, as the desired routing (e.g., in a layered data center topology) only takes straight paths and does not bounce back and forth between layers, to connect a first node and a second node (e.g., VMs in a hypervisor set (A,B)), an upward path of a first node (A) may share a same destination node as an upward path of a second node (B). Although two nodes are described, the present principles may be applied to any number of nodes according to various embodiments. This shared node may be referred to as a common node for the hypervisor set (A, B). A node is defined as a common node for a set of hypervisors if it has at least one downward path to each hypervisor in the set, or equivalently, has at least one upward path to reach the common node.

In one embodiment, the search router/routing search engine 406 may perform a routing search as follows:

| | Routing Searching Method: |
|---|---|
| 1 | for $h_i \in$ hypervisor set H do |
| 2 | $\lfloor \mathcal{T}_i \leftarrow$ GetUpwardGraph($h_i$); $\mathcal{T} \leftarrow \cup_i \mathcal{T}_i$; |
| 3 | CommonNodes $\leftarrow \cap_{\mathcal{T}_i \in \mathcal{T}} \mathcal{T}_i$.nodes( ); |
| 4 | foreach $c_j \in$ CommonNodes do |
| 5 | \| for $h_i \in$ hypervisor set H do |
| 6 | \| $\lfloor \mathcal{N}_i \leftarrow \cup_j$ Get DownwardPath($c_j$, $h_i$, $\mathcal{T}_j$); |
| 7 | return $\mathcal{N} \leftarrow \cup_i \mathcal{N}_i$; |
| 8 | Function: Get UpwardGraph ($h_i$) |
| 9 | return The graph containing all upward paths starting from $h_i$. |
| 10 | Function: GetDownwardPath($c_j$, $h_i$, $\mathcal{T}_j$) |
| 11 | return The downward path from $c_j$ to $h_i$ in graph $\mathcal{T}_j$. |

In one embodiment, the above routing search may be performed by the search router/routing search engine 406 according to the following method: (1) Determine all common nodes for a particular hypervisor set, (2) For each common node, find one downward path from the common node to each hypervisor, and (3) combine these paths to generate one routing candidate.

In one embodiment, as one routing candidate may only include one common node (having more than one will produce loops), the present principles may be employed to determine all desired routing candidates in a data center network. However, even though the present principles may be employed to find all desirable paths in a data center network, the method's complexity may be only O(|E|), where |E| is the number of edges in the upward graph (which is much smaller than the whole data center network). In one embodiment, for a random data center topology (e.g., Jellyfish), the present principles may leverage existing methods to obtain desired routings, and may adopt, for example, a k-shortest path method to determine paths between each hypervisor pair, and then may combine these paths as routing candidates.

In one embodiment, the search results from the routing searching device 406 may be stored in a storage device 410, and may be cached using a hash data structure, where the key may be the hash of the VM placement (in terms of a list of hosting hypervisors), and the value may be a list of routing candidates. Each candidate may be stored as a list of physical link IDs, which may be employed to retrieve link related information (e.g., utilization) from the network information database. Cache results may be updated when network topology is changed according to various embodiments of the present principles.

In block 412, an optimizer may perform optimization (e.g., as described above with reference to element 303 in FIG. 3) according to one embodiment of the present principles. After determining the most desired routing using the optimizer 412, VTNs may be embedded into the data center using an embedder 416 according to the present principles. The embedding may include configuring the switches 408 on the routing (e.g., configuring VLAN tag, adding rules, etc.) to instruct the switches, using the controller 402, to perform desired traffic forwarding for a specific tenant. As some routing configuration actions (e.g., configuring legacy switches) may take a non-trivial period of time to complete, a network actions container 414 may be employed to properly aggregate the configuration tasks to reduce the overall configuration delay. In some embodiments, the network actions container 414 may be a plugin which improves usability of the system 400 according to the present principles. In some embodiments, other plugins that can improve the overall system 400 performance may also be employed according to the present principles.

In the embodiment shown in FIG. 4, the elements thereof are interconnected by a bus 401. However, in other embodiments, other types of connections can also be used. Moreover, in one embodiment, at least one of the elements of system 400 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 400 are readily determined by one of ordinary skill in the art, given the teachings of the present principles provided herein, while maintaining the spirit of the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A computer implemented method for decoupled searching and optimization for one or more data centers, comprising:
   determining a network topology for one or more networks of interconnected computer systems embedded in the one or more data centers;
   searching for routing candidates based on a network topology determined;
   refining a search space for the searching for routing candidates using a scaled exhaustive search, the scaled exhaustive search comprising searching only selected switches and/or hypervisors for all spanning trees that satisfy a pre-determined size constraint specified during the refining a search space; and
   updating and applying one or more objective functions to the routing candidates to determine an optimal routing candidate to satisfy embedding goals based on tenant requests, and to embed the optimal routing candidate in the one or more data centers.

2. The method of claim 1, further comprising determining Virtual Terminal Network (VTN) infoimation, wherein the VTN information includes a list of Virtual Machines (VMs) in the VTN and a hypervisor hosting each of the VMs.

3. The method of claim 1, wherein the searching further comprises:
   determining all common nodes for a hypervisor set;
   locating one downward path from each common node to each hypervisor in the hypervisor set for each common node in a plurality of common nodes; and
   combining paths from all common nodes to each hypervisor to generate one routing candidate.

4. The method of claim 1, wherein the objective functions include a combination function which balances weights of latency, bandwidth, and a number of hops.

5. The method of claim 1, wherein the optimal routing candidate is embedded in a Virtual Terminal Network (VTN) by configuring switches.

6. The method of claim 1, further comprising aggregating configuration tasks in a network action container to reduce an overall configuration delay in the one or more networks.

7. A system for decoupled searching and optimization for one or more data centers, comprising:
   a querying device, connected to one or more networks of interconnected computer systems, to receive a tenant request, the tenant request including one or more embedding goals;
   a search router responsive to the tenant request to determine a network topology of the one or more networks of interconnected computer systems,
      wherein the search router locates routing candidates based on a detetinined network topology, and
      wherein the search router is configured to refine a search space for searching for routing candidates using a scaled exhaustive search, the scaled exhaustive search comprising searching only selected switches and/or hypervisors for all spanning trees that satisfy a pre-determined size constraint specified during the refining of the search space; and
   an optimizer for updating and applying one or more objective functions to the routing candidates to determine an optimal routing candidate to satisfy embedding goals based on tenant requests, and for embedding the optimal routing candidate in the one or more data centers.

8. The system of claim 7, wherein the search router is further configured to determine Virtual Terminal Network (VTN) information, wherein the VTN information includes a list of Virtual Machines (VMs) in the VTN and a hypervisor hosting each of the VMs.

9. The system of claim 7, wherein the search router is further configured to:
   determine all common nodes for a hypervisor set;
   locate one downward path from each common node to each hypervisor in the hypervisor set for each common node in a plurality of common nodes; and
   combine paths from all common nodes to each hypervisor to generate one routing candidate.

10. The system of claim 7, wherein the objective functions include a combination function which balances weights of latency, bandwidth, and a number of hops.

11. The system of claim 7, wherein the optimal routing candidate is embedded in a Virtual Terminal Network (VTN) by configuring switches.

12. The system of claim 7, further comprising a network action container for aggregating configuration tasks to reduce an overall configuration delay in the one or more networks.

13. A non-transitory computer-readable storage medium comprising a computer readable program, wherein the computer readable program when executed on a computer causes the computer to perform the steps of:
   determining a network topology for one or more networks of interconnected computer systems embedded in the one or more data centers;
   searching for routing candidates based on a network topology determined;
   refining a search space for the searching for routing candidates using a scaled exhaustive search, the scaled exhaustive search comprising searching only selected switches and/or hypervisors for all spanning trees that satisfy a pre-determined size constraint specified during the refining a search space; and
   updating and applying one or more objective functions to the routing candidates to determine an optimal routing candidate to satisfy embedding goals based on tenant requests, and to embed the optimal routing candidate in the one or more data centers.

14. The computer-readable storage medium of claim 13, wherein the searching further comprises:
   determining all common nodes for a hypervisor set;
   locating one downward path from each common node to each hypervisor in the hypervisor set for each common node in a plurality of common nodes; and
   combining paths from all common nodes to each hypervisor to generate one routing candidate.

15. The computer-readable storage medium of claim 13, wherein the optimal routing candidate is embedded in a Virtual Terminal Network (VTN) by configuring switches.

* * * * *